US012403574B2

(12) United States Patent
Kukucka et al.

(10) Patent No.: US 12,403,574 B2
(45) Date of Patent: Sep. 2, 2025

(54) FASTENER EXTRACTOR DEVICE

(71) Applicant: GRIP HOLDINGS LLC, Brandon, FL (US)

(72) Inventors: Paul Kukucka, Brandon, FL (US); Thomas Stefan Kukucka, Brandon, FL (US)

(73) Assignee: GRIP HOLDINGS LLC, Brandon, FL (US)

( * ) Notice: Subject to any disclaimer, the term of this patent is extended or adjusted under 35 U.S.C. 154(b) by 0 days.

(21) Appl. No.: 17/509,633

(22) Filed: Oct. 25, 2021

(65) Prior Publication Data

US 2022/0040834 A1 Feb. 10, 2022

Related U.S. Application Data

(63) Continuation-in-part of application No. 16/255,341, filed on Jan. 23, 2019, now Pat. No. 11,154,969, which is a continuation-in-part of application No. 16/107,842, filed on Aug. 21, 2018, now Pat. No. 10,780,556, and a continuation-in-part of application No. PCT/IB2017/054379, filed on Jul. 19, 2017, and a continuation-in-part of application No. 15/601,864, filed on May 22, 2017, now abandoned, and a (Continued)

(51) Int. Cl.
*B25B 27/18* (2006.01)
*B25B 15/00* (2006.01)

(52) U.S. Cl.
CPC ............ *B25B 27/18* (2013.01); *B25B 15/008* (2013.01)

(58) Field of Classification Search
CPC ..... B25B 13/04; B25B 13/063; B25B 15/001; B25B 15/008; B25B 23/08; B25B 27/18; B25B 13/065
USPC .................................................. 81/53.2, 461
See application file for complete search history.

(56) References Cited

U.S. PATENT DOCUMENTS 1,549,041 A 8/1925 Berg
1,798,944 A 3/1931 Jackman (Continued)

FOREIGN PATENT DOCUMENTS

AU 201612229 4/2016
AU 201612720 6/2016

(Continued)

*Primary Examiner* — Brian D Keller
*Assistant Examiner* — Marcel T Dion

(57) ABSTRACT

A fastener extractor tool is an apparatus that is used to remove a seized or damaged fastener. The apparatus may include at least one shank body and at least one torque-tool body. The at least one shank body allows the apparatus to be attached to an external torque tool. The torque-tool body engages the seized fastener to apply torque to dislodge said seized fastener. The at least one torque-tool body may include a plurality of laterally-bracing sidewalls and at least one engagement feature. The plurality of laterally-bracing sidewalls engage with the seized fastener to efficiently transfer torque from the external torque tool to the seized fastener. The at least one engagement feature is an engagement cavity that forms at least one engagement tooth on the at least one torque-tool body. The at least one engagement tooth engages the seized fastener to ensure torque is transferred to the seized fastener.

15 Claims, 20 Drawing Sheets

Related U.S. Application Data continuation-in-part of application No. PCT/IB2017/052453, filed on Apr. 27, 2017.

(60) Provisional application No. 62/733,507, filed on Sep. 19, 2018, provisional application No. 62/328,102, filed on Apr. 27, 2016.

(56) References Cited

U.S. PATENT DOCUMENTS 1,863,045 A * 6/1932 Randall ........ B25B 27/18 81/441
1,875,484 A * 9/1932 Nigra ........ B25B 27/18 81/441
3,405,377 A 10/1968 Pierce
3,495,485 A 2/1970 Knudsen et al.
3,902,384 A 9/1975 Ehrler
3,908,489 A 9/1975 Yamamoto et al.
4,074,597 A 2/1978 Jansson
4,598,616 A 7/1986 Colvin
4,607,547 A 8/1986 Martus
4,893,530 A 1/1990 Warheit
4,927,020 A 5/1990 Randy
4,930,378 A 6/1990 Colvin
4,970,922 A * 11/1990 Krivec ........ B25B 15/005 81/451
5,019,080 A 5/1991 Hemer
5,031,487 A 7/1991 Polonsky
5,219,392 A 6/1993 Ruzicka et al.
5,228,570 A 7/1993 Robinson
5,251,521 A 10/1993 Burda et al.
5,398,823 A 3/1995 Anders
5,481,948 A 1/1996 Zerkovitz
5,501,342 A 3/1996 Geibel
5,519,929 A 5/1996 Bleckman
5,645,177 A 7/1997 Lin
5,669,516 A 9/1997 Horn
5,725,107 A 3/1998 Dembicks
5,743,394 A 4/1998 Martin
5,782,148 A 7/1998 Kerkhoven
5,829,327 A 11/1998 Stanton
5,832,792 A 11/1998 Hsieh
5,873,290 A 2/1999 Chaconas
6,009,778 A 1/2000 Hsieh
6,092,279 A 7/2000 Shoup
6,352,011 B1 3/2002 Fruhm
6,431,373 B1 8/2002 Blick
6,575,057 B1 6/2003 Ploeger
6,698,316 B1 3/2004 Wright
6,755,098 B2 6/2004 Huang
6,761,089 B2 7/2004 Bergamo
6,857,340 B2 2/2005 Wagner
6,951,156 B2 10/2005 Garg
7,000,501 B1 2/2006 Chen
D524,615 S 7/2006 Albertson
7,225,710 B2 6/2007 Pacheco, Jr.
7,331,260 B2 2/2008 Cheng
D614,931 S 5/2010 Su
7,717,278 B2 5/2010 Kao
7,788,994 B2 9/2010 Wright et al.
7,841,480 B2 11/2010 Hsieh
7,913,593 B2 3/2011 Dahar et al.
8,166,851 B2 5/2012 Pchola
8,302,255 B2 11/2012 Lin
8,336,709 B1 12/2012 Geibel
D745,814 S 12/2015 Hsieh
D776,505 S 1/2017 Doroslovac
D784,106 S 4/2017 Doroslovac
9,687,968 B2 6/2017 Doroslovac et al.
D794,405 S 8/2017 Doroslovac et al.
9,718,170 B2 8/2017 Eggert et al.
D798,682 S 10/2017 Doroslovac et al.
9,873,195 B1 1/2018 Buxton
9,878,441 B1 1/2018 Kao
D829,069 S 9/2018 Doroslovac et al.
10,081,094 B2 9/2018 Doroslovac et al.
D859,944 S 9/2019 Kukucka et al.
D859,945 S 9/2019 Kukucka et al.
D859,946 S 9/2019 Kukucka et al.
D859,947 S 9/2019 Kukucka et al.
D867,841 S 11/2019 Kukucka et al.
D868,553 S 12/2019 Kukucka et al.
D879,577 S 3/2020 Kukucka et al.
D880,968 S 4/2020 Kukucka et al.
D880,977 S 4/2020 Kukucka et al.
D885,149 S 5/2020 Kukucka et al.
D887,233 S 6/2020 Kukucka et al.
D887,711 S 6/2020 Kukucka et al.
D889,224 S 7/2020 Kukucka et al.
D889,257 S 7/2020 Kukucka et al.
D892,578 S 8/2020 Kukucka et al.
10,780,556 B2 9/2020 Kukucka et al.
10,786,890 B2 9/2020 Kukucka et al.
D899,091 S 10/2020 Kukucka et al.
10,828,766 B2 11/2020 Kukucka et al.
D904,152 S 12/2020 Kukucka et al.
D906,781 S 1/2021 Kukucka et al.
10,882,162 B2 1/2021 Kukucka et al.
D909,842 S 2/2021 Kukucka et al.
D910,490 S 2/2021 Lim et al.
10,919,133 B2 2/2021 Kukucka et al.
10,967,488 B2 4/2021 Kukucka et al.
11,154,969 B2 * 10/2021 Kukucka ........ B25B 15/008
2003/0136228 A1 * 7/2003 Liu ........ B25B 27/18 81/53.2
2003/0209111 A1 11/2003 Huang
2004/0256263 A1 12/2004 Shih
2005/0098459 A1 5/2005 Gorman
2005/0103664 A1 5/2005 Shih
2005/0257357 A1 11/2005 Huang
2006/0130618 A1 6/2006 Hsieh
2006/0156869 A1 7/2006 Hsieh
2006/0266168 A1 11/2006 Pacheco, Jr.
2007/0079674 A1 * 4/2007 Rupp ........ B25B 23/108 81/53.2
2007/0261519 A1 11/2007 Cheng
2008/0235930 A1 10/2008 English
2009/0003967 A1 * 1/2009 Luna ........ B25B 15/005 411/404
2009/0007732 A1 1/2009 Hsieh
2009/0120885 A1 5/2009 Kao
2009/0220321 A1 9/2009 Sakamura
2009/0255384 A1 10/2009 Whitehead
2010/0037734 A1 * 2/2010 Kozak ........ B25B 27/18 81/53.2
2010/0064863 A1 3/2010 Kozak
2011/0056339 A1 3/2011 Su
2011/0252925 A1 * 10/2011 Whitehead ........ B25B 15/005 81/53.2
2011/0303052 A1 12/2011 Chen
2012/0060656 A1 3/2012 Chang
2013/0047798 A1 2/2013 Huang
2013/0213193 A1 * 8/2013 Lukes ........ B25B 15/005 81/436
2014/0260832 A1 9/2014 Hsiao
2014/0331826 A1 11/2014 Campbell
2014/0360321 A1 12/2014 Steinweg et al.
2015/0093212 A1 * 4/2015 Pinheiro ........ F16B 23/003 411/403
2015/0135910 A1 5/2015 Eggert et al.
2015/0266169 A1 9/2015 Campbell, II
2015/0314429 A1 11/2015 Doroslovac
2015/0335368 A1 * 11/2015 Auger ........ B25B 15/004 606/319
2016/0046008 A1 2/2016 Thomas
2016/0067853 A1 3/2016 Neto
2016/0136792 A1 5/2016 Harp
2016/0223005 A1 8/2016 Rathmann
2016/0339564 A1 11/2016 Chen
2017/0246733 A1 8/2017 Shehab
2017/0252905 A1 9/2017 Doroslovac
2017/0282337 A1 10/2017 Johnson et al.
2017/0312839 A1 11/2017 Moss et al.

(56) References Cited

U.S. PATENT DOCUMENTS

| | | | |
|---|---|---|---|
| 2017/0312897 A1 | 11/2017 | Doroslovac et al. | |
| 2018/0001450 A1* | 1/2018 | Anderson | B25B 27/18 |
| 2018/0003241 A1 | 1/2018 | Goss | |
| 2018/0141192 A1 | 5/2018 | Chang | |
| 2018/0354022 A1 | 12/2018 | Ross et al. | |
| 2018/0354102 A1 | 12/2018 | Kukucka et al. | |
| 2019/0001469 A1 | 1/2019 | Cho et al. | |
| 2019/0015961 A1 | 1/2019 | Kukucka et al. | |
| 2019/0039216 A1* | 2/2019 | Ikada | B25B 13/488 |
| 2019/0152033 A1 | 5/2019 | Kukucka et al. | |
| 2019/0283233 A1 | 9/2019 | Kukucka et al. | |
| 2019/0337131 A1 | 11/2019 | Kukucka et al. | |
| 2019/0375077 A1 | 12/2019 | Kukucka et al. | |
| 2020/0070321 A1* | 3/2020 | Schulz | B25B 15/008 |
| 2020/0078908 A1 | 3/2020 | Wu et al. | |
| 2020/0298380 A1 | 9/2020 | Doroslovac et al. | |
| 2020/0376648 A1 | 12/2020 | Kukucka et al. | |
| 2020/0391360 A1 | 12/2020 | Kukucka et al. | |
| 2021/0039245 A1 | 2/2021 | Kukucka et al. | |

FOREIGN PATENT DOCUMENTS

| | | | |
|---|---|---|---|
| AU | 201612721 | | 6/2016 |
| CA | 2564093 | A1 | 4/2007 |
| CA | 168071 | | 12/2016 |
| CA | 2898480 | A1 | 7/2017 |
| CN | 2767068 | Y | 3/2006 |
| CN | 3630254 | | 6/2006 |
| CN | 201046555 | Y | 4/2008 |
| CN | 101208181 | A | 6/2008 |
| CN | 101973013 | | 2/2011 |
| CN | 102395447 | | 3/2012 |
| CN | 102554833 | A | 7/2012 |
| CN | 203197845 | U | 9/2013 |
| CN | 103639950 | A | 3/2014 |
| CN | 303924849 | | 11/2016 |
| CN | 303956827 | | 12/2016 |
| CN | 303984883 | | 12/2016 |
| CN | 207824800 | U | 9/2018 |
| DE | 3911409 | A1 | 10/1990 |
| DE | 29613327 | U1 | 9/1996 |
| DE | 10321284 | A1 | 12/2004 |
| DE | 202010006146 | U1 | 7/2010 |
| DE | 102013021238 | A1 | 6/2015 |
| EP | 0930132 | A2 | 7/1999 |
| EP | 0930132 | A3 | 11/2000 |
| EP | 1371453 | A2 | 12/2003 |
| EP | 1731774 | A1 | 12/2006 |
| EP | 0930132 | B1 | 4/2007 |
| EP | 2363245 | | 9/2011 |
| GB | 906839 | A | 9/1962 |
| GB | 1294764 | A | 11/1972 |
| JP | H0615580 | A | 1/1994 |
| JP | H0737805 | B2 | 4/1995 |
| JP | 2011143522 | | 7/2011 |
| JP | 2012157913 | | 10/2011 |
| JP | 2014100742 | | 6/2014 |
| JP | 2017042898 | A | 3/2017 |
| JP | 2015180835 | A | 7/2017 |
| KR | 200149097 | Y1 | 7/1999 |
| RU | 2152870 | C1 | 7/2000 |
| RU | 2225786 | C2 | 1/2001 |
| RU | 45671 | U1 | 5/2005 |
| RU | 58510 | U1 | 11/2006 |
| RU | 2387533 | C1 | 4/2010 |
| RU | 116398 | | 5/2012 |
| RU | 180548 | U1 | 6/2018 |
| SU | 16616 | A1 | 8/1930 |
| TW | 542769 | B | 7/2003 |
| TW | M442238 | | 12/2012 |
| TW | 201341127 | A | 10/2013 |
| TW | 201829135 | | 8/2018 |
| WO | WO1994016862 | A1 | 8/1994 |
| WO | WO1996010932 | A1 | 4/1996 |
| WO | WO1996026870 | A1 | 9/1996 |
| WO | WO1996027745 | A1 | 9/1996 |
| WO | WO1997010926 | A1 | 3/1997 |
| WO | WO9812982 | A1 | 4/1998 |
| WO | WO1998012982 | A1 | 4/1998 |
| WO | WO1999032264 | A1 | 7/1999 |
| WO | WO2001066312 | A1 | 9/2001 |
| WO | WO2004002687 | A1 | 1/2004 |
| WO | WO2005070621 | | 8/2005 |
| WO | WO2006023374 | | 3/2006 |
| WO | WO2006130490 | A1 | 12/2006 |
| WO | WO2010007402 | A1 | 1/2010 |
| WO | WO2011109040 | A1 | 9/2011 |
| WO | WO2015050942 | A1 | 4/2015 |
| WO | WO2015082283 | A1 | 6/2015 |
| WO | 090809 | | 4/2016 |
| WO | WO2016051080 | A1 | 4/2016 |
| WO | 091188 | | 5/2016 |
| WO | 091189 | | 5/2016 |
| WO | WO2016174615 | A1 | 11/2016 |
| WO | WO2017069953 | A1 | 4/2017 |
| WO | WO2017178997 | | 10/2017 |
| WO | WO2017187388 | A1 | 11/2017 |
| WO | 2018150360 | | 8/2018 |
| WO | WO2018172831 | | 9/2018 |
| WO | WO2018172831 | A1 | 9/2018 |
| WO | WO2019012486 | | 1/2019 |
| WO | WO2019167032 | | 9/2019 |
| WO | WO2019175652 | | 9/2019 |
| WO | WO2020039281 | | 2/2020 |
| WO | WO2020039285 | | 2/2020 |
| WO | WO2020058777 | | 3/2020 |
| WO | WO2020152516 | | 7/2020 |
| WO | WO2020208608 | | 10/2020 |
| WO | WO2020225800 | | 11/2020 |
| WO | WO2021001696 | | 1/2021 |
| WO | WO2021019500 | | 2/2021 |
| WO | WO2021033152 | | 2/2021 |

* cited by examiner

FASTENER EXTRACTOR DEVICE

The current application is a continuation-in-part (CIP) application of a U.S. non-provisional application Ser. No. 16/255,341 filed on Jan. 23, 2019. The U.S. non-provisional application Ser. No. 16/255,341 claims a priority to a U.S. Provisional Patent application Ser. No. 62/733,507 filed on Sep. 19, 2018.

FIELD OF THE INVENTION

The present invention generally relates to tools designed for extracting or removing fasteners, in particular bolts and nuts. More specifically, the present invention discloses a combination of anti-slip threaded extractors, designed to remove damaged fasteners.

BACKGROUND OF THE INVENTION

Hex bolts, nuts, screws, and other similar threaded devices are used to secure and hold multiple components together by being engaged to a complimentary thread, known as a female thread. The general structure of these types of fasteners is a cylindrical shaft with an external thread and a head at one end of the shaft. The external thread engages a complimentary female thread tapped into a hole or a nut and secures the fastener in place, thus fastening the associated components together. To engage the fastener, the head receives an external torque force from an external tool such as a wrench or screwdriver which rotates the rest of the fastener, thus driving the fastener into the female threading. Further, the head is shaped specifically to allow the external tool to apply the torque to the fastener in order to rotate the fastener and engage the complimentary female threading to a certain degree. This type of fastener is simple, extremely effective, cheap, and highly popular in modern construction.

One of the most common problems in using these types of fasteners, whether male or female, is the tool slipping in the head portion, or slipping on the head portion. This is generally caused by either a worn fastener or tool, corrosion, overtightening, or damage to the head portion of the fastener. Now, various methods may be used to remove a fastener, some more aggressive than others, as once a fastener head is damaged, a more aggressive method must be implemented to remove the seized fastener. Drilling out the fastener is a common method utilized by some users to dislodge the fastener. While this method can prove to be effective in some scenarios, there is a high risk of damaging the internal threads of the hole. So, an objective of the present invention is to provide an extractor removal system that virtually eliminates the chance of slippage. The design of the present invention uses a series of integrated splines that bite into the head of the fastener and allow for efficient torque transfer between the extractor bit and the head portion of the fastener. Another common issue when using traditional bolt extractors is that material from the fastener or the actual fastener remains attached to the extractor tool. The present invention allows users to dislodge any remaining material and or the fastener from the extracting tool.

DETAIL DESCRIPTIONS OF THE INVENTION

Figure 1:
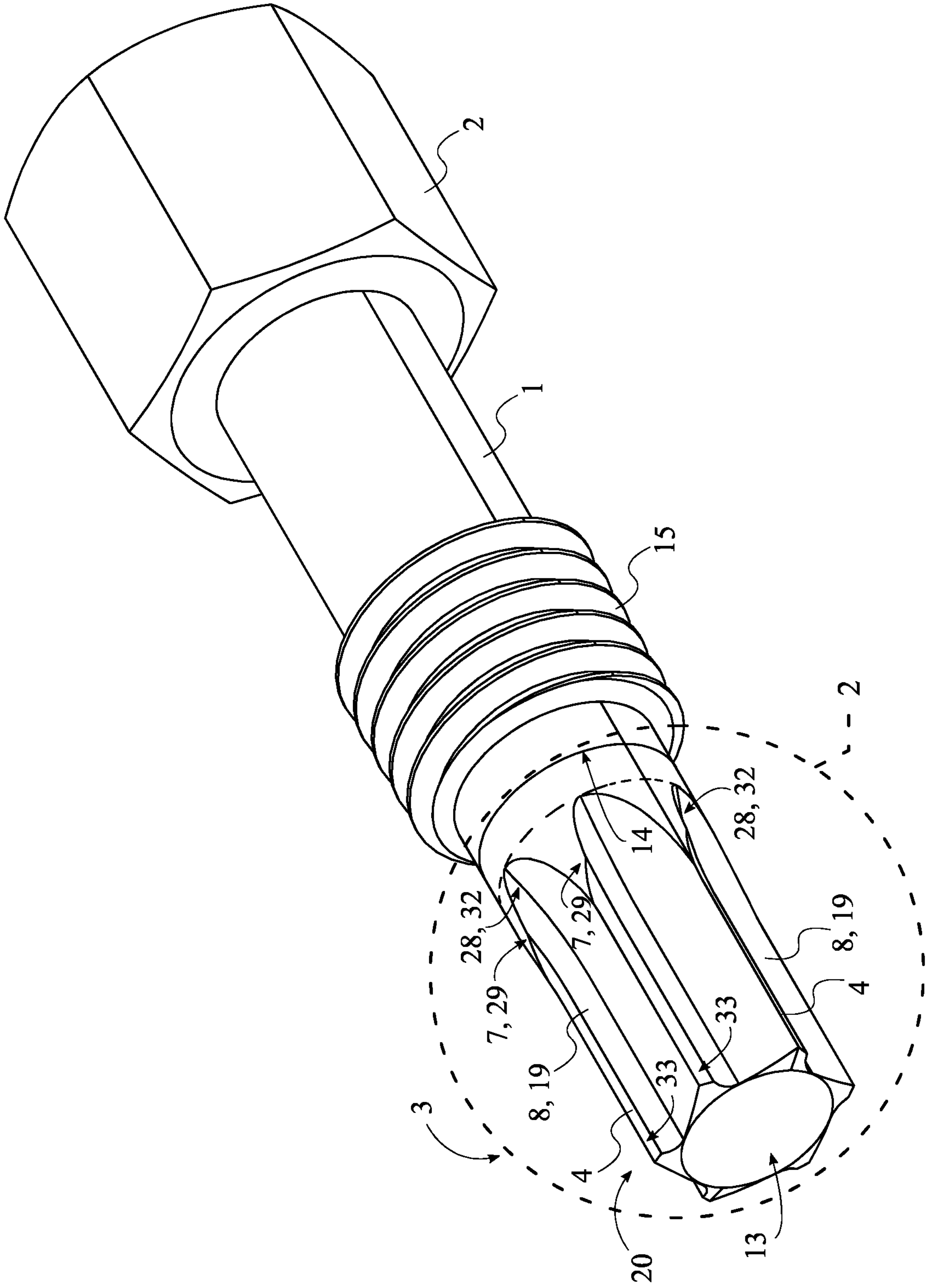
FIG. 1 is a top front perspective view of a first embodiment of the present invention.
Figure 2:
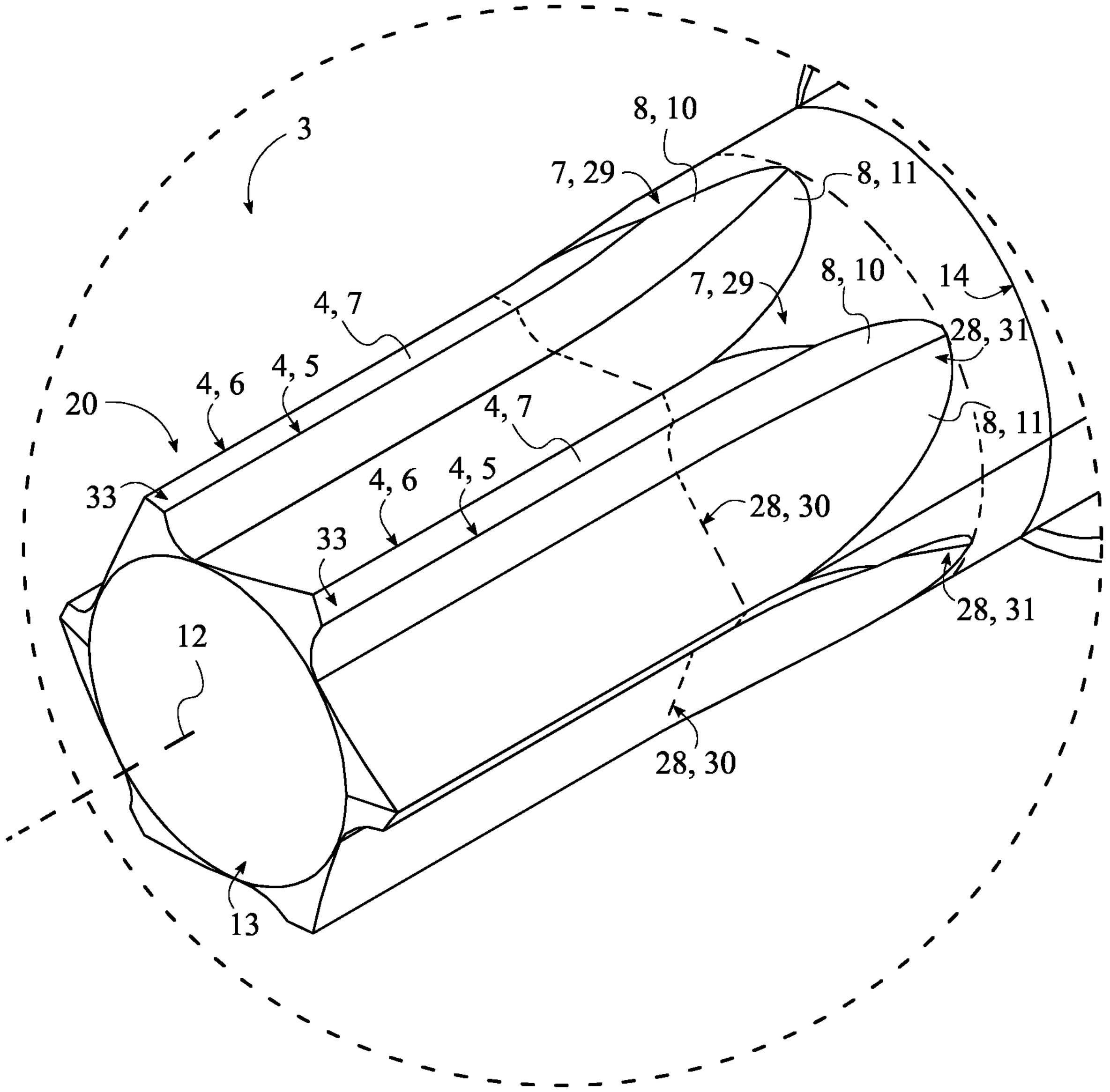
FIG. 2 is a magnified view of the torque-tool body of the first embodiment of the present invention shown in FIG. 1.
Figure 3:
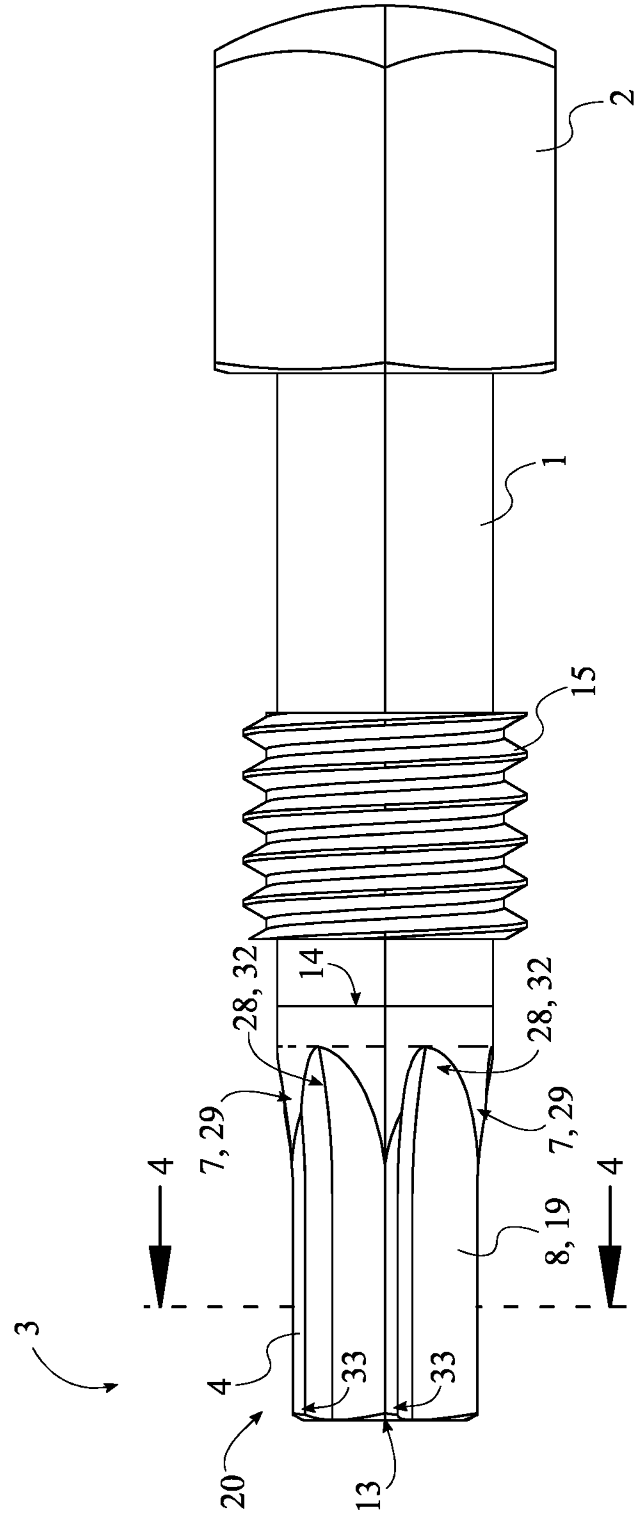
FIG. 3 is a side view of the first embodiment of the present invention.

All illustrations of the drawings are for the purpose of describing selected versions of the present invention and are not intended to limit the scope of the present invention.

The present invention is generally related to extraction tools and extraction tool accessories. More specifically, the present invention discloses various extractor bits, including both male and female embodiments. In addition, removing damaged fasteners from an extractor tool can prove to be a difficult task. The present invention aims to solve this issue by disclosing a releasable sleeve coupled to an extractor tool, specifically designed to assist users with removing any pieces of broken fastener which may have been wedged onto the extractor tool.

Referring to FIG. 1 through 6 and 12 through 16, the present invention comprises at least one shank body 1 and at least one torque-tool body 3. The at least one shank body 1 allows the present invention to be attached to an external torque tool and, thus, allow torque to be applied to the socket fastener through the at least one torque-tool body 3 for extraction, similar to traditional designs. External torque tools include, but are not limited to, electric drills, torque wrenches, pneumatic drills, socket screw drivers, and any other tools able to transmit torque. Further, the at least one shank body 1 preferably has a circular cross-sectional profile, but other polygonal profiles may be used if preferred and are considered part of the present invention.

The torque-tool body 3 is preferably a shank-like structure which engages a seized socket fastener, such as a socket screw, a socket bolt, or a specific sized drilled hole within a broken stud, any threaded shank, pipe or threadably removable object in order to apply torque force to dislodge said seized fastener. Referring to FIG. 1 through 6 and 12 through 16, the at least one torque-tool body 3 comprises a plurality of laterally-bracing sidewalls 4 and at least one engagement feature 8. In general, the at least one torque-tool body 3 is preferably a prism composed of a strong metal that is terminally and concentrically connected to the shank body 1. The at least one torque-tool body 3 is terminally and concentrically connected to the at least one shank body 1. This arrangement forms an overall elongated and cylindrical structure. The plurality of laterally-bracing sidewalls 4 is radially positioned about a rotation axis 12 of the at least one torque-tool body 3 to yield a geometric profile complimentary to that of a socket fastener or aperture within any rationally removable object. The number within the plurality of laterally-bracing sidewalls 4 is subject to change to compliment the shape and profile of a variety of socket fasteners. Moreover, each of the plurality of laterally-bracing sidewalls 4 engage within and grip the socket fastener in order to efficiently transfer torque from the external torque tool to the socket fastener. In one embodiment, the number of the plurality of laterally-bracing sidewalls 4 is six and the resulting geometric profile of the at least one torque-tool body 3 is a hexagon. In an alternative embodiment, the number of the plurality of laterally-bracing sidewalls 4 is four and the resulting geometric profile of the at least one torque-tool body 3 is a square. In alternative embodiments, the shank body 1 and torque tool body 3 may be the same shape or comprise the same components. In other words, the engagement cavity 8, the bracing surface 7, and the engagement tooth 33 may continue along the length of the elongated tool.

Figure 4:
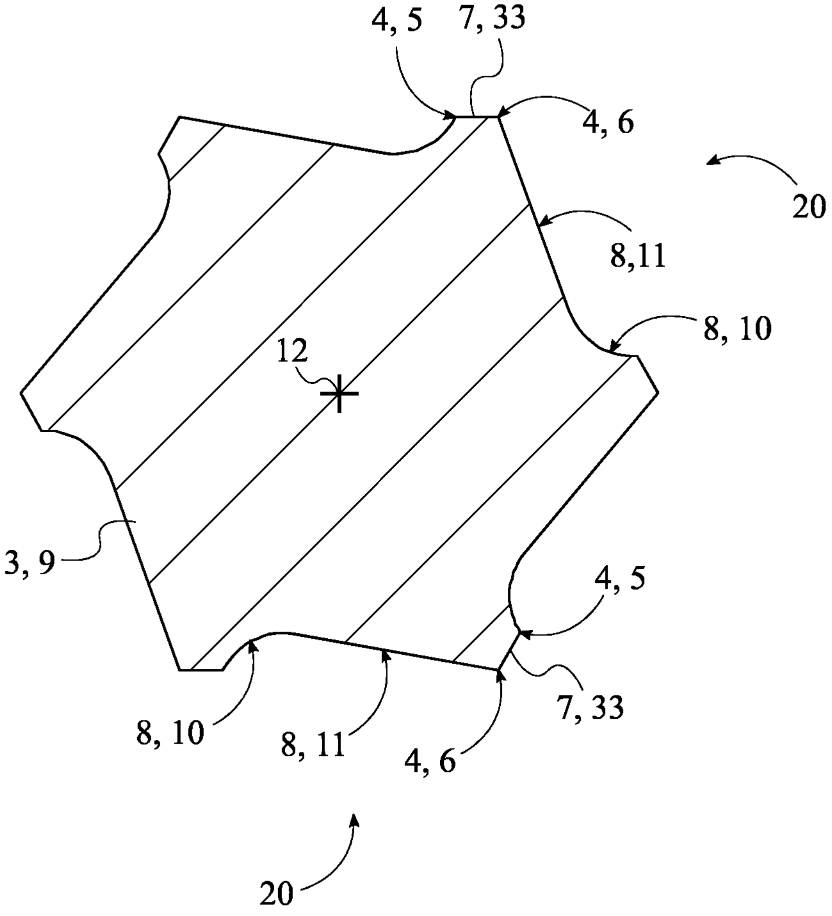
FIG. 4 is an enlarged vertical cross-sectional view taken along line 4-4 in FIG. 3.
Figure 5:
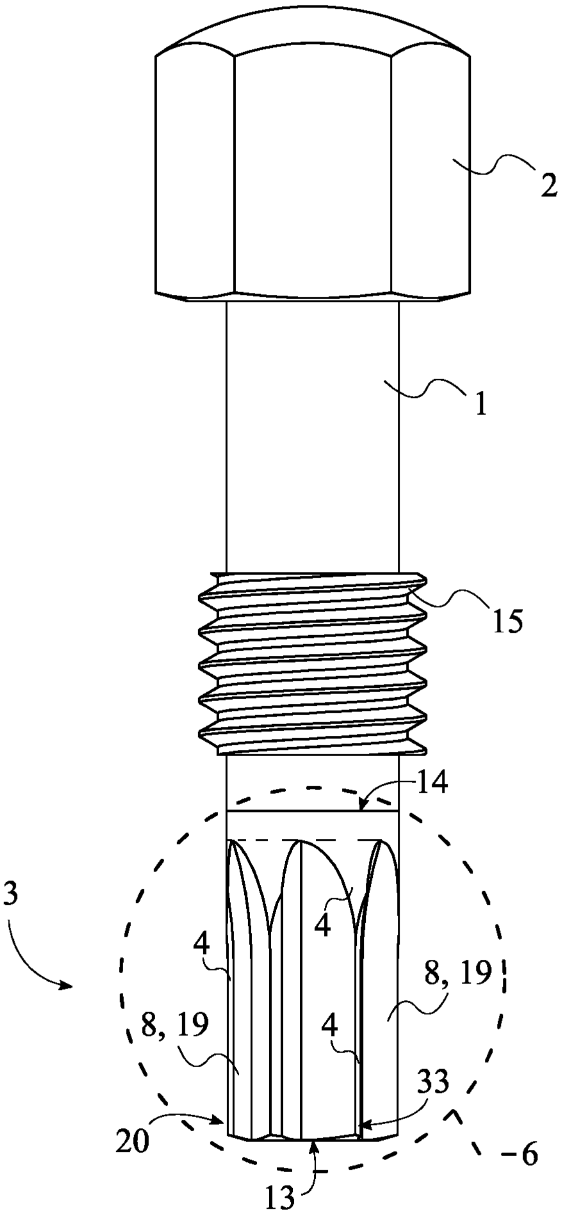
FIG. 5 is a top view of the first embodiment of the present invention.
Figure 6:
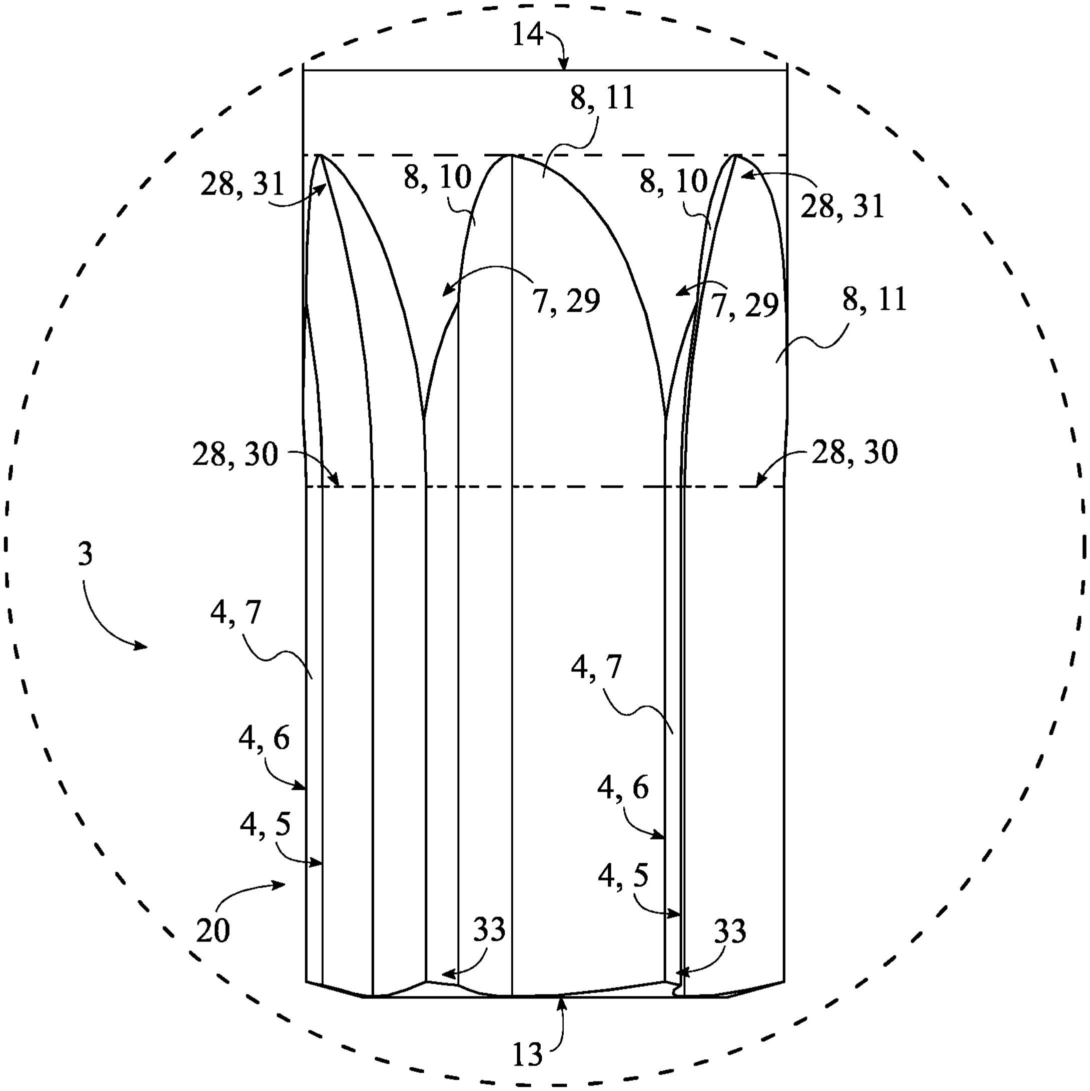
FIG. 6 is a magnified view of the torque-tool body of the first embodiment of the present invention shown in FIG. 5.
Figure 15:
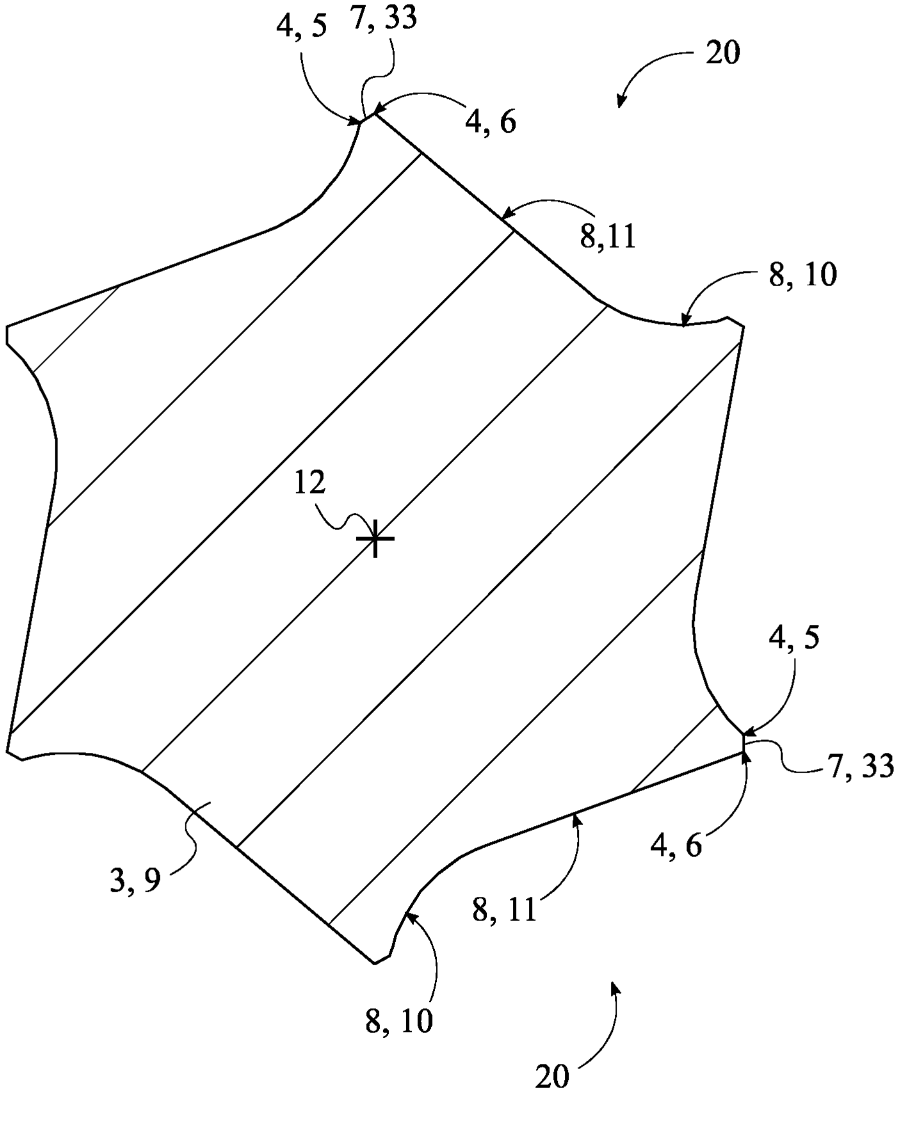
FIG. 15 is an enlarged vertical cross-sectional view taken along line 15-15 in FIG. 14.
Figure 16:
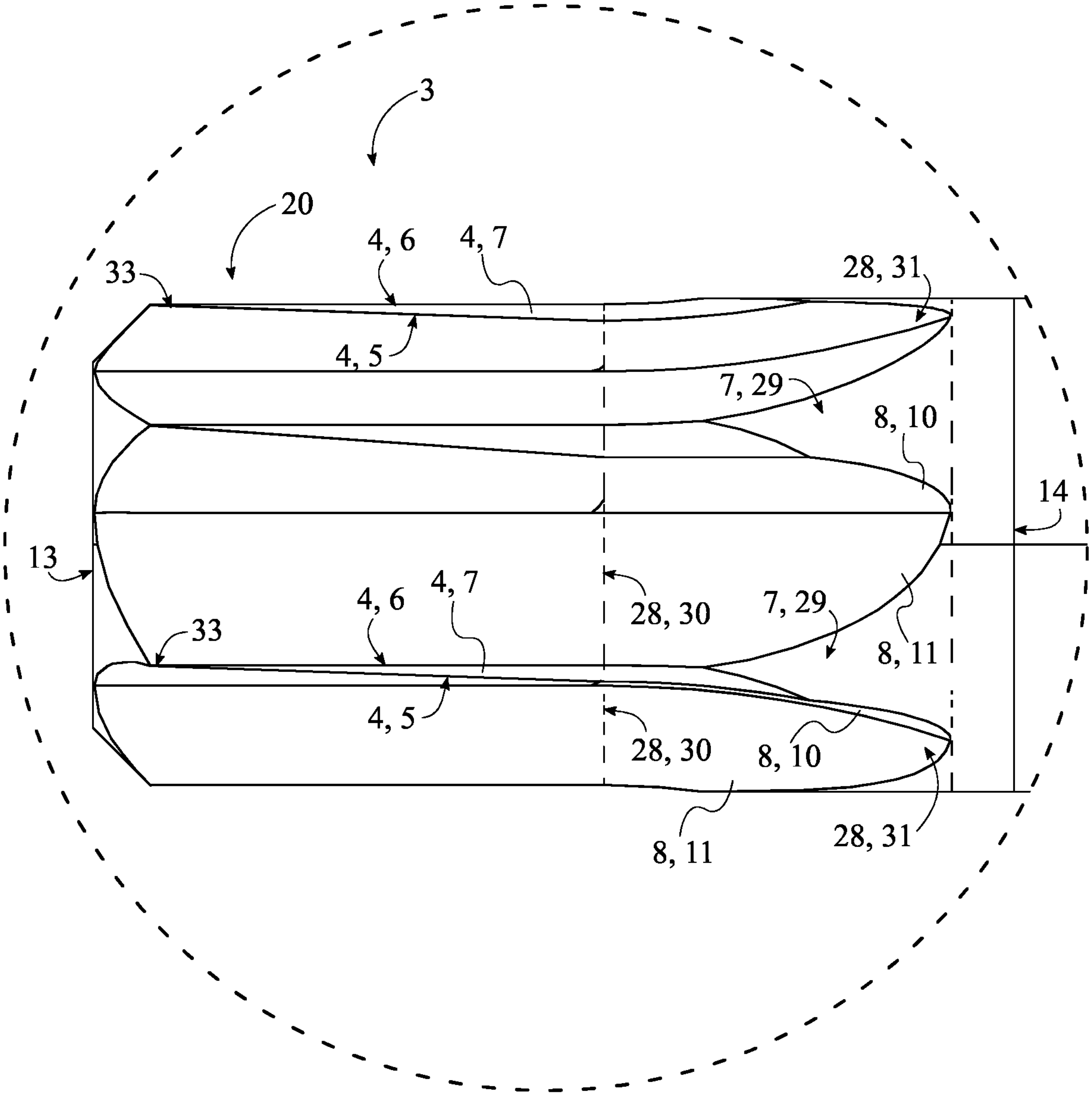
FIG. 16 is a magnified view of the torque-tool body of the third embodiment of the present invention shown in FIG. 14.
Figure 17:
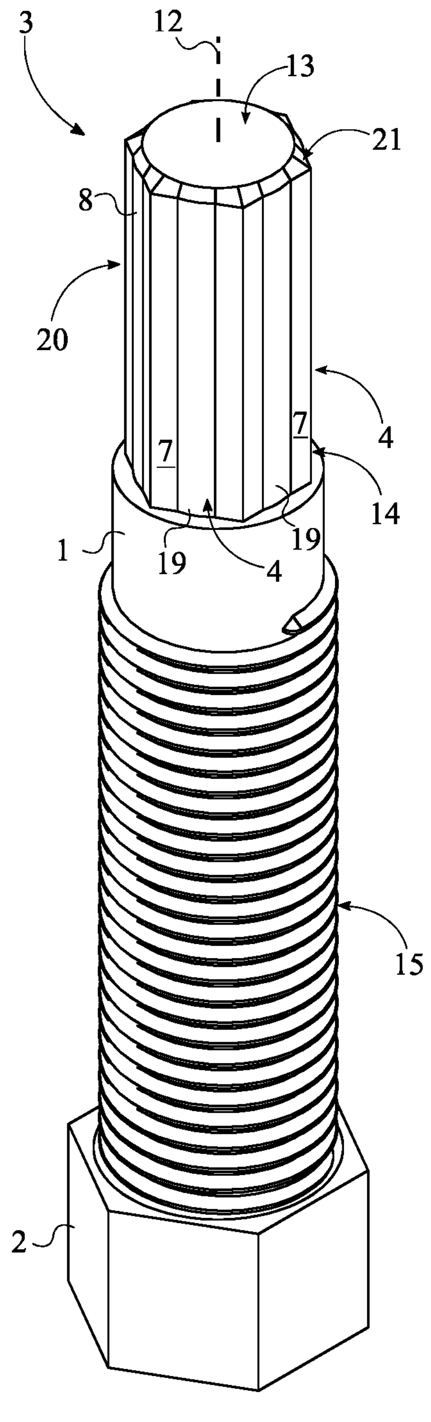
FIG. 17 is a top perspective view of a fourth embodiment of the present invention.
Figure 18:
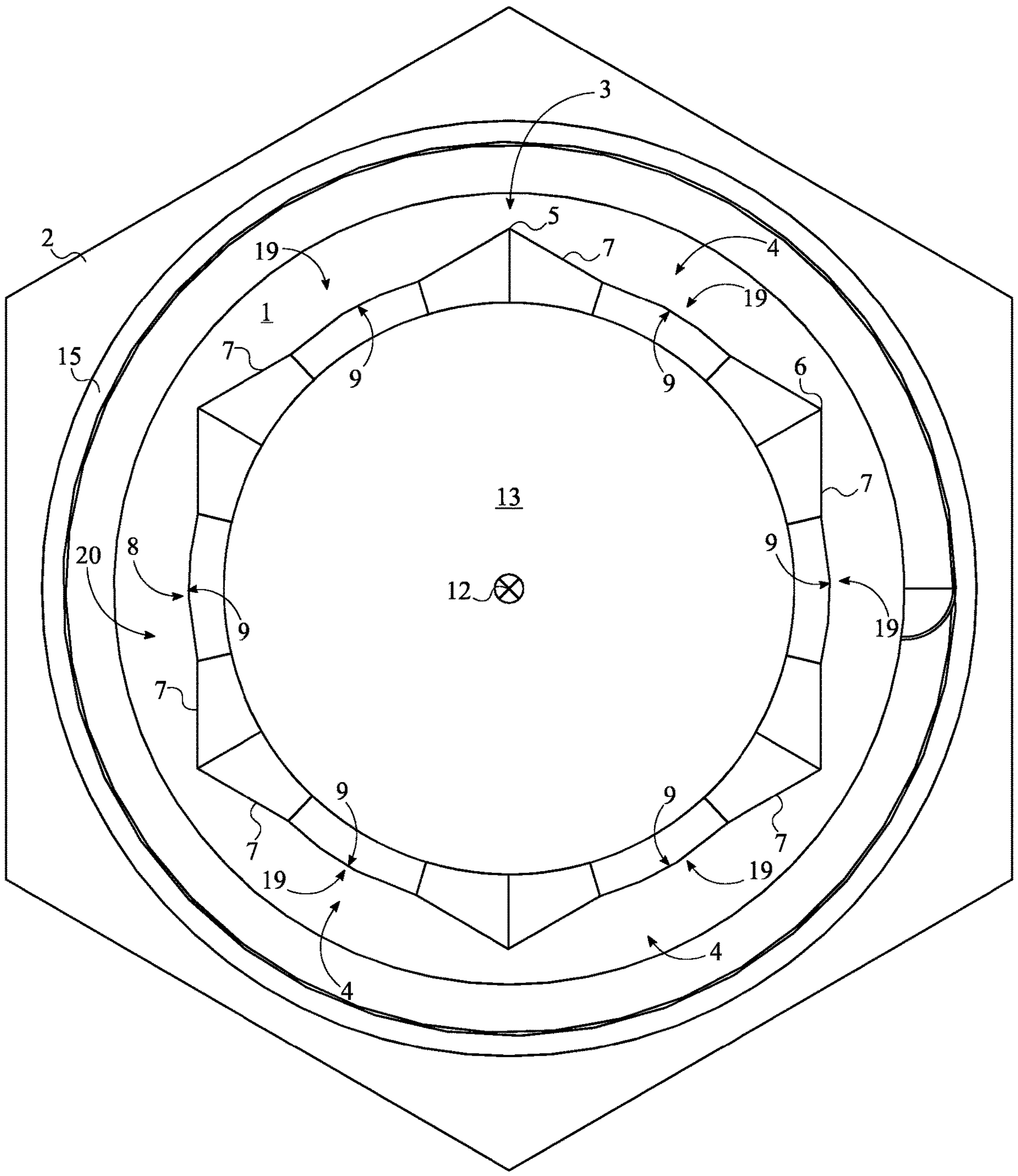
FIG. 18 is a top view of the fourth embodiment of the present invention.
Figure 19:
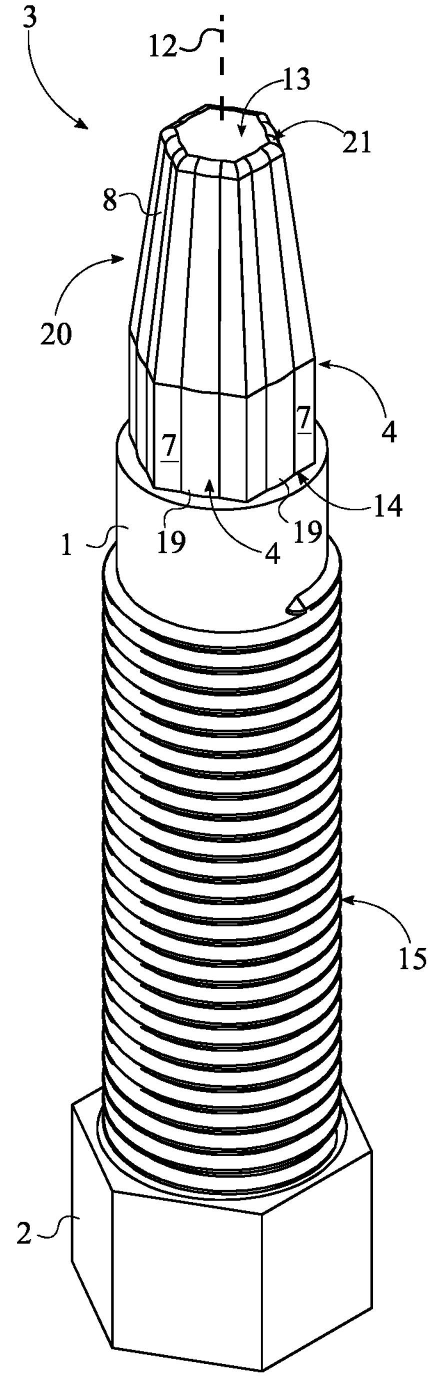
FIG. 19 is a top perspective view of a fifth embodiment of the present invention.

In one embodiment, the at least one engagement feature 8 is preferably an engagement cavity to create at least one recession on the at least one torque-tool body 3. So, the at least one engagement cavity 8 is integrated into specific sidewall from the plurality of sidewalls 4 to receive the drive features of the fastener's head. Referring to FIG. 1 through 6 and 12 through 16, each of the plurality of laterally-bracing sidewalls 4 comprises a first lateral edge 5, a second lateral edge 6, and a bracing surface 7. The bracing surface 7 physically presses against a socket fastener, specifically against a lateral sidewall of a head portion of a socket fastener or the lateral sidewalls of an aperture within a rotationally removable object. The first lateral edge 5 and the second lateral edge 6 are positioned opposite to each other across the bracing surface 7. The bracing surface 7 is preferably a flat surface but may be a convex or concave surface, or a combination thereof. When viewed from either the top perspective or the bottom perspective, the first lateral edge 5 and the second lateral edge 6 from each of the plurality of laterally-bracing sidewalls 4 make up the corners of the at least one torque-tool body 3. Moreover, the engagement cavity 8 partially traverses normal and into the bracing surface 7 of the specific sidewall 20 such that at least one engagement tooth 33 is formed on the bracing surface 7 of the specific sidewall. The engagement tooth 33 is created by the engagement cavity 8 and the bracing surface 7 so that the engagement tooth 33 serves as a gripping point for the present invention. In addition, due to the way the at least one engagement tooth 33 is formed on the bracing surface 7, a length of the at least one engagement tooth 33 is less than or equal to a length of the at least one engagement cavity 8. Referring to FIGS. 4 and 15, a width of the at least one engagement tooth 33 extending from the first base 13 and towards the second base 14 along the rotation axis 12 is also less than or equal to a width of the at least one engagement cavity 8 extending along the rotation axis 12 due to the various profiles that the engagement cavity 8 may have. In alternative embodiments, the engagement tooth 33 may be created by adding material to the bracing surface in the form of a protrusion rather than removing said material.

In some embodiments, the bracing surface 7 of a specific sidewall 20 may be offset to the bracing surface 7 of the adjacent sidewall. In another embodiment, the first lateral edge 5 and the second lateral edge 6 may be positioned coplanar to each other. However, the first lateral edge 5 and the second lateral edge 6 may be positioned offset to each other as well. Referring to FIG. 12 through 16, the bracing surface 7 width may also taper from the first base 13 towards the second base 14. In other words, a width distance of the bracing surface 7 from first lateral edge 5 to the second lateral edge 6 adjacent to first base 13 may be less than a bracing surface 7 width distance from first lateral edge 5 to second lateral edge 6 adjacent to second base 14.

Referring to FIGS. 4 and 15, in one embodiment, the entire cross-section 9 of the engagement cavity 8 comprises a curved portion 10 and a straight portion 11. The resulting gripping point is uniquely shaped in order to form the sharp engagement tooth 33 that digs into at least one corner of the socket fastener, allowing material from the internal sides of the fastener socket into the engagement cavity 8, and thus yielding a superior grip over traditional tools which are simply designed to push material away. This is especially true for worn or damaged fastener sockets. The engagement tooth 33 may be constructed of three surfaces, one being a face surface and two being side surfaces. The face surface may be a flat surface, while the side surfaces may include a concave surface, a convex surface, or a combination of both. Similarly, the bracing surface 7 may be a flat surface, a concave surface, or a convex surface, or a combination of the said surfaces.

Moreover, the curved portion 10 may be a partially circular curve that is positioned adjacent to the first lateral edge 5 of the specific sidewall 20. Referring to FIG. 1 through 6 and 12 through 16, the straight portion 11 is positioned adjacent to the curved portion 10, opposite to the first lateral edge 5 of the specific sidewall 20. The straight portion 11 guides a portion of the socket fastener to press against the formed engagement tooth 33. As such, the straight portion 11 extends from the curved portion 10 to the second lateral edge 6 of the specific sidewall 20. Specifically, the straight portion 11 starts at the curved portion 10 and ends at the second lateral edge 6 of the specific sidewall 20. This embodiment may be implemented in a clockwise configuration or a counterclockwise configuration by flipping the positioning of the curved portion 10 with the straight portion 11. In other embodiments, the curved portion 10 and/or the straight portion 11 may be replaced with other shape profiles as in straight, concave, or convex shapes, or combination of said shapes or profiles that may result in different shape profiles of the engagement tooth 33. Furthermore, the engagement cavity 8 may traverse normal and into a portion of the bracing surface 7 of the specific sidewall without traversing into a remaining portion of the bracing surface 7 of the specific sidewall. This increases the sharpness of the engagement tooth 33 without affecting the strength of the torque-tool body 3. The remaining portion of the bracing surface 7 of the specific sidewall is also preferably flat which, depending on the design, may result in an arc length of the curved portion 10 being larger than a length of the remaining portion of the bracing surface 7 of the specific sidewall and less than a length of the straight portion 11.

In one embodiment of the present invention, the entire cross-section 9 of the engagement cavity 8 is a partially-circular profile, as shown in FIGS. 4 and 15. Additionally, the partially-circular profile is concave along a direction from the first lateral edge 5 of the specific sidewall 20 to the second lateral edge 6 of the specific sidewall 20. The partially-circular profile ensures that there are little to no high stress points in the at least one torque-tool body 3, thus increasing the overall longevity of the tool. In a separate embodiment of the present invention, the entire cross-section 9 of the engagement cavity is a triangular profile, as shown in FIG. 17 through 20. Additionally, the triangular profile is concave along a direction from the first lateral edge 5 of the specific sidewall 20 to the second lateral edge 6 of the specific sidewall 20. Alternative profiles may be used for the engagement cavity 8 including, but not limited to, a semi-square profile, a semi-rectangular profile, and a semi-oval profile. It is preferred that the internal corners of triangular, square, semi square type profiles have a radius for additional structural strength. In another embodiment of the present invention, the engagement cavity 8 is centrally positioned on the bracing surface 7 of the specific sidewall 20. In particular, the engagement cavity 8 is positioned offset from the first lateral edge 5 of the specific sidewall 20 by a first distance and offset from the second lateral edge 6 of the specific sidewall 20 by a second distance; wherein the first distance equals the second distance. In an alternative embodiment, the first distance may not be equal to the second distance. This positions the engagement cavity 8 to engage the internal lateral sidewall of the socket fastener for the most efficient transfer of torque with the least possibility of slippage. Additionally, this embodiment may be used to rotate the socket fastener in either the clockwise or the counterclockwise direction.

In some embodiments, the present invention may further comprise a drive head 2 and at least one external thread 15. Referring to FIG. 1 through 6 and 12 through 16, like the at least one shank body 1, the drive head 2 allows the present invention to be attached to an external torque tool and, thus, allow torque to be applied to the socket fastener through the at least one torque-tool body 3 for extraction. The drive head 2 acts as the engagement element for the external torque tool. Specifically, the drive head 2 is a nut-shaped element that is terminally and concentrically connected to the at least one shank body 1. The preferred profile of the drive head 2 is a hexagonal profile although alternative geometries may also be utilized. For example, in one embodiment, the drive head 2 has a square profile. In another embodiment, the bottom portion of the drive head 2 is dome shaped. Specifically, the bottom portion is the portion of the drive head 2 that is located opposite the shank body 1, across the drive head 2. The dome-shaped design yields a striking surface where impact force is applied to forcibly insert the torque-tool body 3 into the object to be extracted. However, the striking surface is not limited to being dome shaped. Further, the at least one shank body 1 preferably has a circular cross-sectional profile, but other polygonal profiles may be used if preferred and are considered part of the present invention. In addition, the torque-tool body 3 is positioned opposite the drive head 2, along the at least one shank body 1. Moreover, the at least one external thread 15 extends along the shank body 1 in between the at least one torque-tool body 3 and the drive head 2. Additionally, the at least one external thread 15 is laterally connected to the at least one shank body 1. In other embodiments, the drive head can be replaced with other engagement means.

In some embodiments, the present invention may further comprise a tubular sleeve 16, an internal thread 17, and a nut 18. Referring to FIG. 8 through 11, the tubular sleeve 16 is an elongated tubular structure with an internal diameter complimentary to the external diameter of the at least one shank body 1. The tubular sleeve 16, the internal thread 17, the at least one external thread 15, and the nut 18 act as a dislodging mechanism for removing any excess material and or a socket fastener from the at least one torque-tool body 3. The preferred tubular sleeve 16 design includes a diameter step-up along the tubular sleeve 16 at a first end of the tubular sleeve 16, wherein the first end of the tubular sleeve 16 is positioned adjacent to the at least one torque-tool body 3. This provides additional engagement surface in between the tubular sleeve 16 and the foreign object affixed to the at least one torque-tool body 3. In general, the tubular sleeve 16 translates along the at least one shank body 1 in order to press against a socket fastener on the at least one torque-tool body 3 until said socket fastener, i.e., foreign object, is dislodged. The internal thread 17 is designed complimentary to the external thread 15 for an interlocking fit. The internal thread 17 is positioned within the tubular sleeve 16 and extends along the tubular sleeve 16.

Additionally, the internal thread 17 laterally traverses into the tubular sleeve 16. Referring to FIG. 8 through 11, for operation, the at least one shank body 1 is concentrically positioned within the tubular sleeve 16 with the internal thread 17 being mechanically engaged to the at least one external thread 15. This allows the tubular sleeve 16 to slide along the at least one shank body 1 when the at least one shank body 1 and the tubular sleeve 16 are spun relative to each other. After the at least one torque-tool body 3 is used to remove a seized socket fastener, the user may need to remove the socket fastener from the at least one torque-tool body 3. For this, the user simply spins the tubular sleeve 16 about the at least one shank body 1 to slide the tubular sleeve 16 towards the at least one torque-tool body 3 until the tubular sleeve 16 presses against the socket fastener to dislodge the socket fastener. Rotating the tubular sleeve 16 may be done with the user's hands, but in cases where additional leverage is necessary the user may use two external torque tools, such as wrenches. One wrench is mechanically engaged to shank body 1 through the drive head 2 and the other wrench is mechanically engaged to the tubular sleeve 16 through the nut 18. For this, the nut 18 is terminally and concentrically connected to the tubular sleeve 16. Similar to the tubular sleeve 16, the at least one shank body 1 is also positioned within the nut 18. The preferred shaped of the nut 18 is a hex, although alternative geometries may also be used. The size, length, and material composition of the tubular sleeve 16 and the nut 18 are subject to change to meet the needs and preferences of the user. The tubular sleeve 16 may further comprise any polygonal shape complementary to the nut 18 or otherwise. In some embodiments, the tubular sleeve 16 and the nut 18 may be constructed of a single polygonal shape and or a single piece.

Furthermore, in some embodiments, referring to FIG. 1 through 6 and 12 through 16, the at least one engagement feature 8 preferably comprises a plurality of engagement features 19. For this, the plurality of engagement features 19 is radially positioned about the rotation axis 12 with each of the plurality of engagement features 19 being integrated into the corresponding laterally-bracing sidewall from the plurality of laterally-bracing sidewalls 4. This configuration yields an additional gripping feature on each of the plurality of laterally-bracing sidewalls 4 that ensure that a significant grip is created in between the present invention and a socket fastener.

In some embodiments, the at least one torque-tool body 3 may further comprise a first base 13 and a second base 14 corresponding to the bases of polygonal-shaped body, as shown in FIG. 1 through 6 and 12 through 20. In one embodiment, the engagement feature 8 extends into the torque-tool body 3 from the first base 13 towards the second base 14. This ensures that the engagement tooth 33 extends along the length of the at least one torque-tool body 3 for maximum grip engagement. Referring to FIG. 1 through 6, the first base 13 and the second base 14 are positioned opposite and preferably parallel to each other along the plurality of laterally-bracing sidewalls 4; wherein the at least one shank body 1 is adjacently connected to the second base 14, opposite the first base 13. In some embodiments, the first base 13 and second base 14 are oriented perpendicular to each of the plurality of laterally-bracing sidewalls 4 and thus enclose/complete the prism shape of the at least one torque-tool body 3. More specifically, it is preferred that the first base 13 comprises a first base surface, wherein the first base surface is flat and is oriented perpendicular to the each of the plurality of laterally-bracing sidewalls 4. Further, the first base 13 may be convex shaped to yield a point, similar to a tool punch. When impact force is applied to the drive head 2, the engagement tooth 33 cuts into the sidewall of the object to be removed. Further, the at least one torque-tool body 3 may taper from the second base 14 towards the first base 13 to allow the present invention to be used on socket fasteners of different sizes. The degree of taper is subject to change to meet the needs and preferences of the user. In one embodiment of the present invention, the torque-tool body 3 may be connected to various implements including, but not limited to, impact tools, hydraulic screws, wrench sockets, and screwdrivers. To further ensure maximum grip engagement, it is preferred that an entire cross-section 9 of the engagement cavity 8 is oriented parallel to the first base 13 and the second base 14. The bracing surface 7 width may also taper from the first base 13 towards the second base 14. In other words, a width distance of the bracing surface 7 from first lateral edge 5 to the second lateral edge 6 adjacent to first base 13 may be less than a bracing surface 7 width distance from first lateral edge 5 to second lateral edge 6 adjacent to second base 14.

Figure 7:
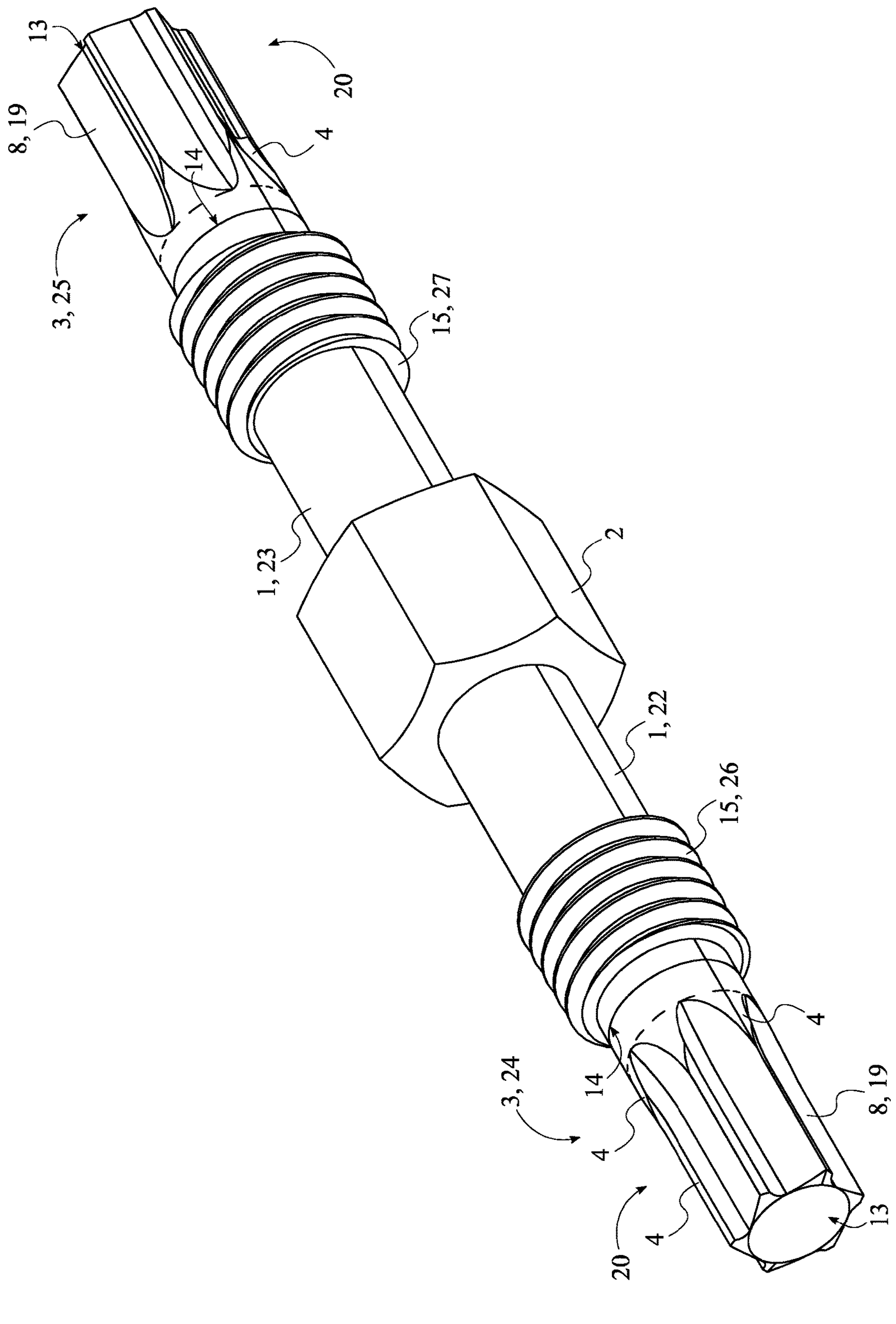
FIG. 7 is a top front perspective view showing a second embodiment of the present invention, wherein the present invention is shown with two shank bodies and two torque-tool bodies.
Figure 8:
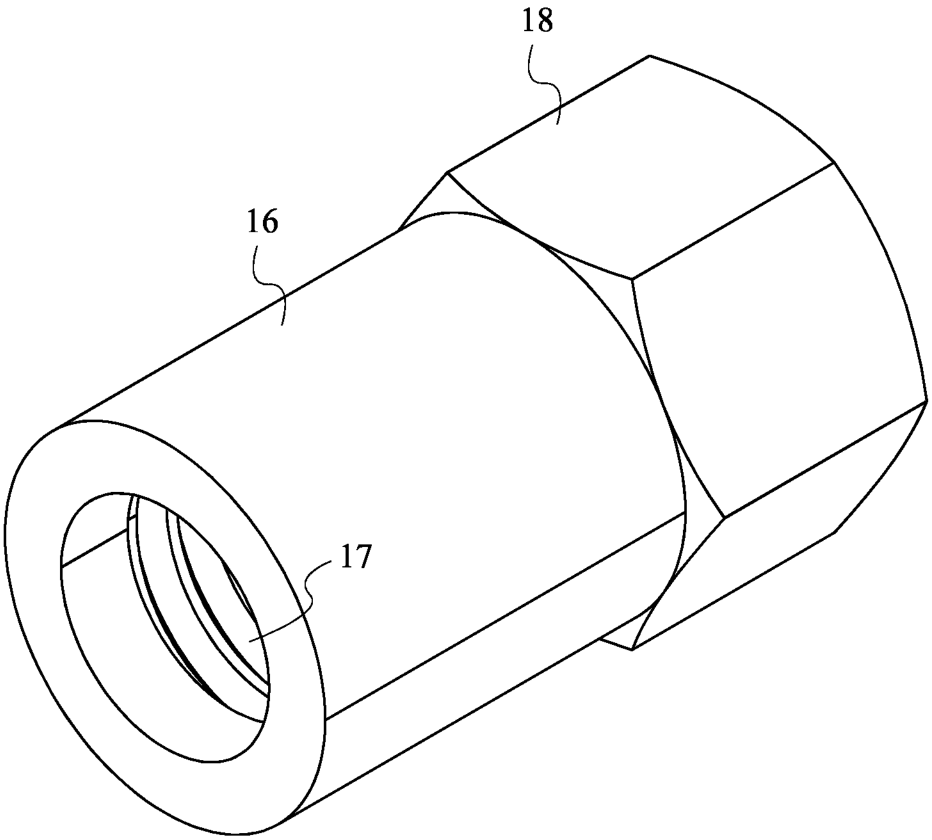
FIG. 8 is a top front perspective view showing the tubular sleeve of the present invention.
Figure 9:
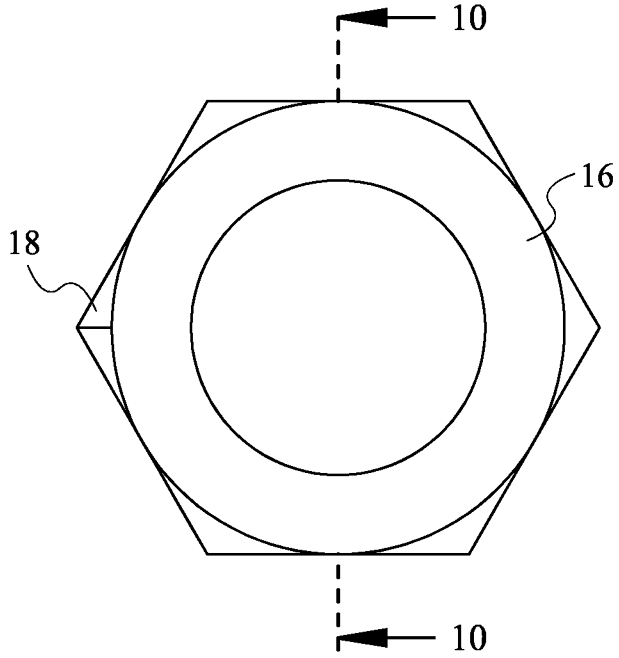
FIG. 9 is a front view showing the tubular sleeve of the present invention.
Figure 10:
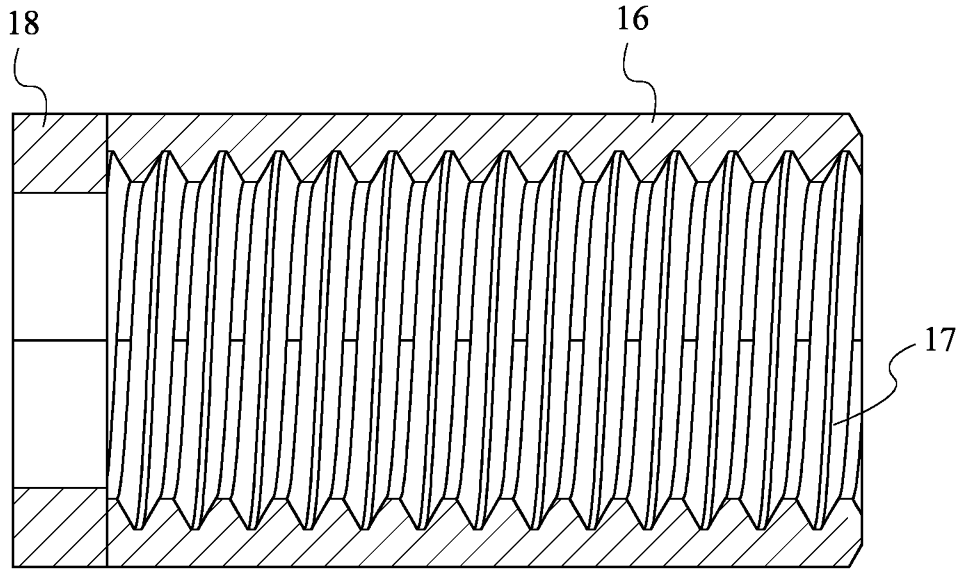
FIG. 10 is a vertical cross-sectional view of the tubular sleeve of the present invention taken along line 10-10 in FIG. 9.
Figure 11:
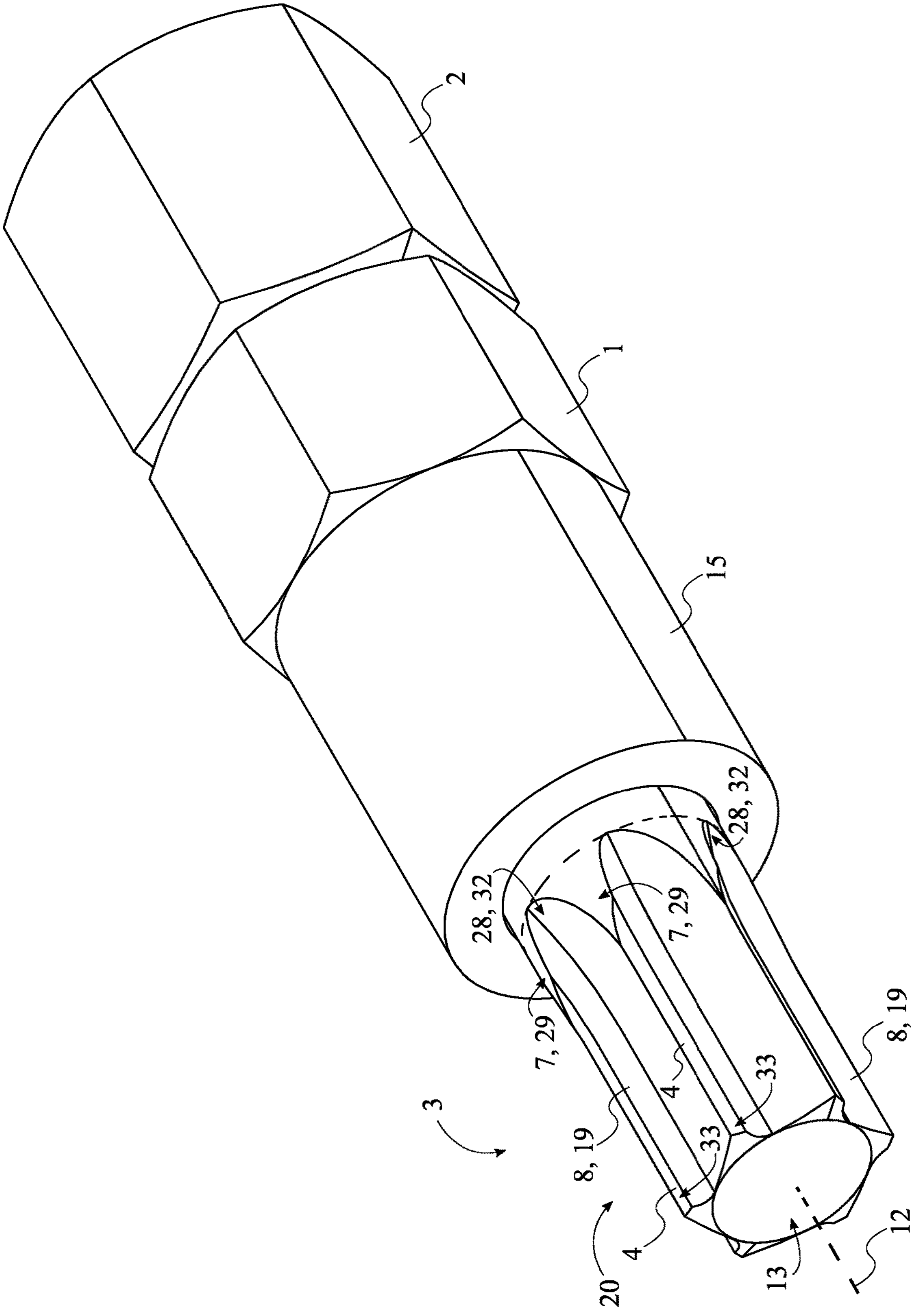
FIG. 11 is a top front perspective view showing the tubular sleeve engaged with the external thread of the first embodiment of the present invention.
Figure 12:
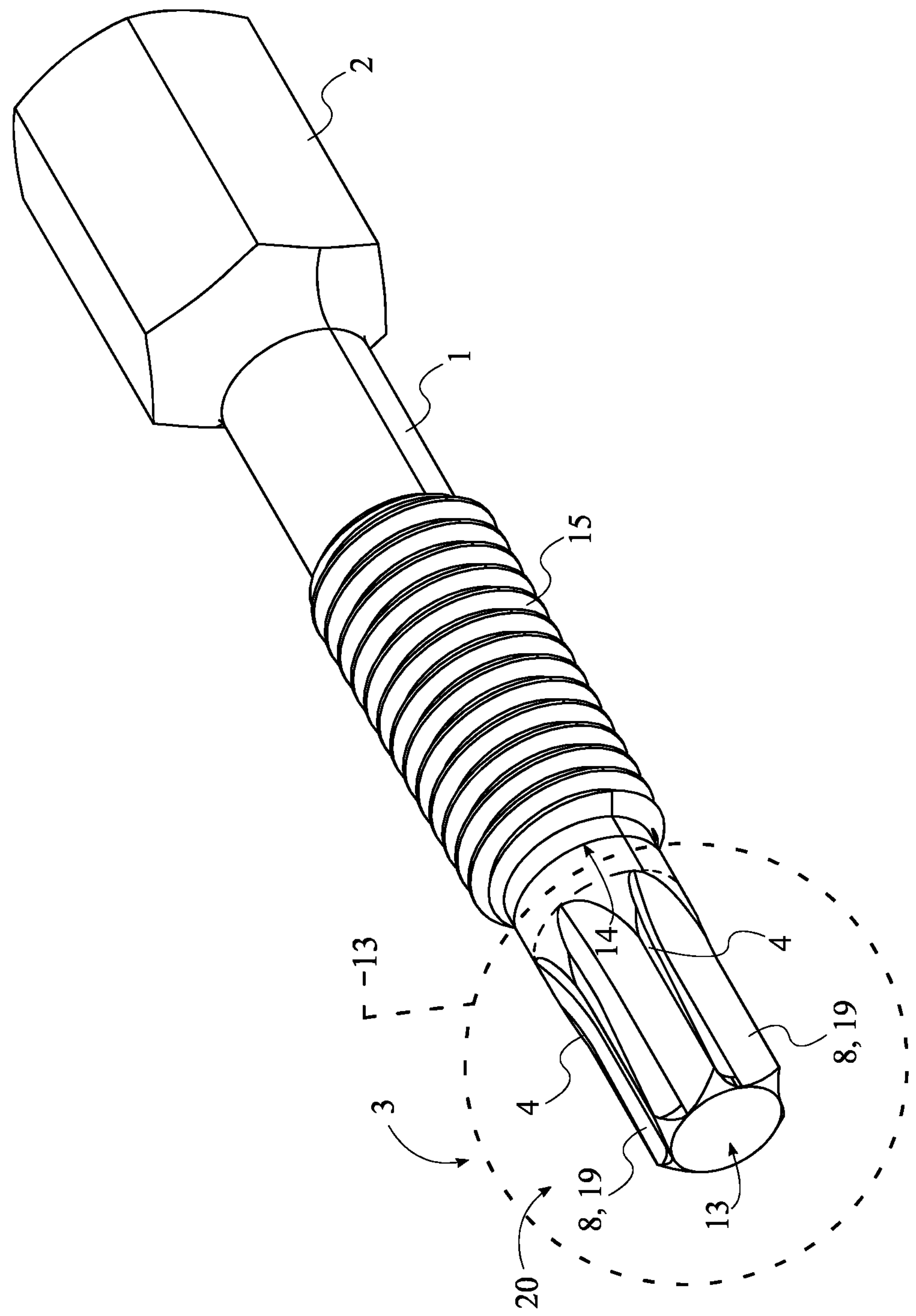
FIG. 12 is a top front perspective view of a third embodiment of the present invention.
Figure 13:
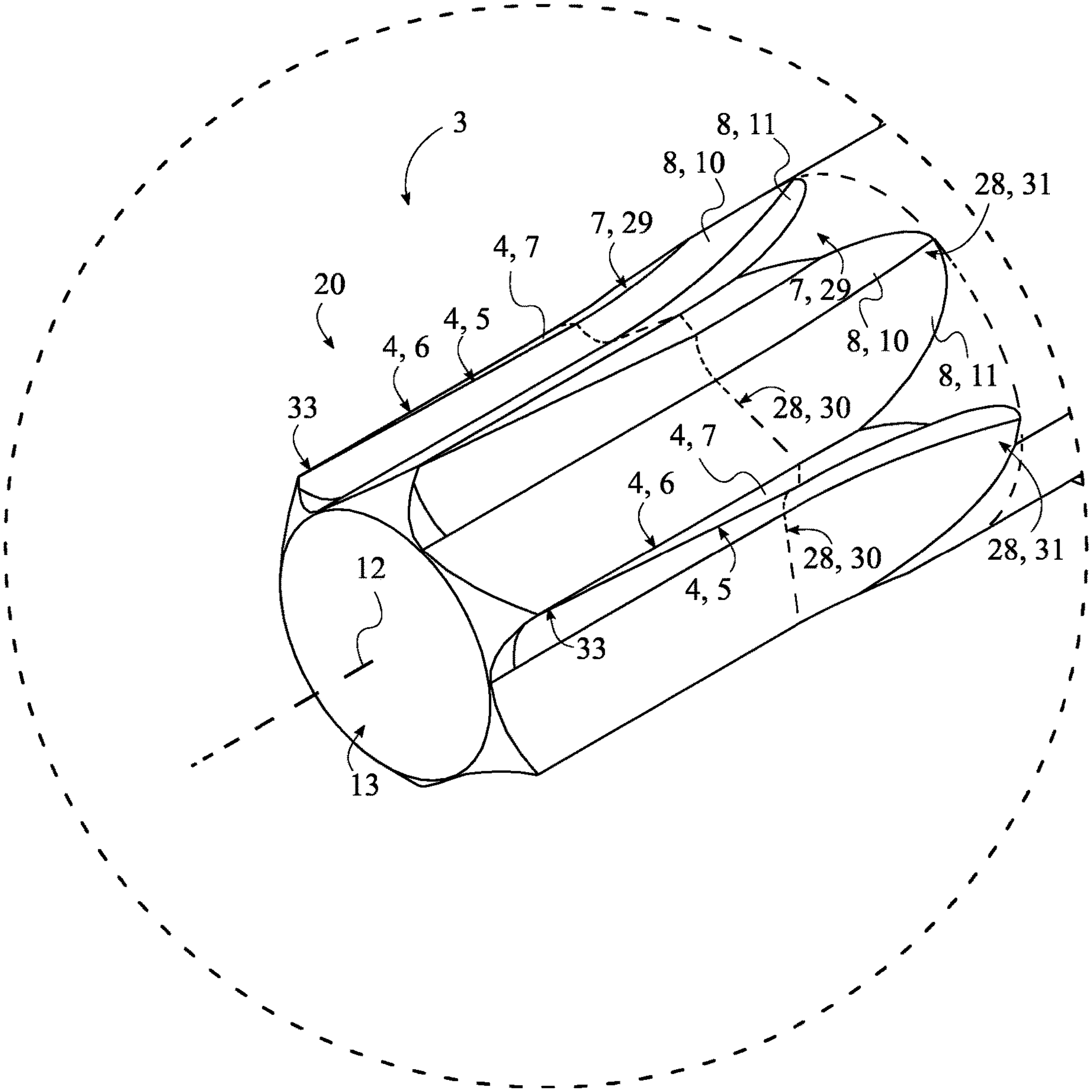
FIG. 13 is a magnified view of the torque-tool body of the third embodiment of the present invention shown in FIG. 12.
Figure 14:
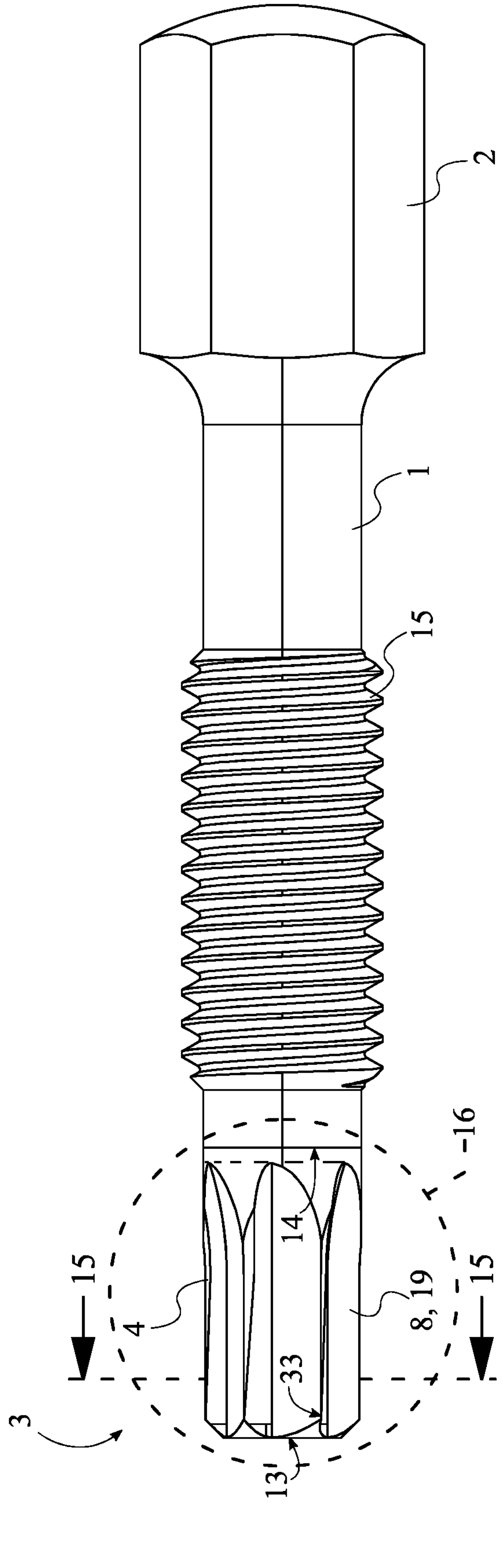
FIG. 14 is a side view of the third embodiment of the present invention.
Figure 20:
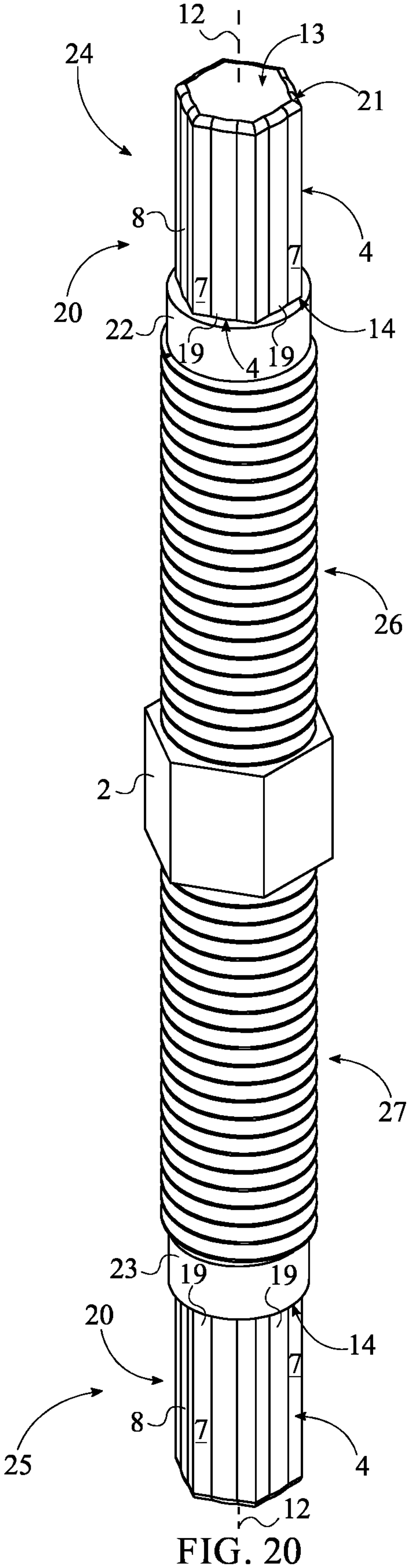
FIG. 20 is a top front perspective view showing a sixth embodiment of the present invention, wherein the present invention is shown with two shank bodies and two torque-tool bodies of the fourth embodiment.

In one embodiment, referring to FIGS. 7 and 20, the present invention is implemented in a double-ended configuration. In this embodiment, the at least one shank body 1 comprises a first shank body 22 and a second shank body 23; the at least one torque-tool body 3 comprises a first torque-tool body 24 and a second torque-tool body 25; and the at least one external thread 15 comprises a first external thread 26 and a second external thread 27. This embodiment provides a dual sided version for the present invention, wherein the two sides may be differently designed and or oriented for increased versatility; specifically, this allows the present invention to be utilized for clockwise rotation and counterclockwise rotation. The first shank body 22 and the second shank body 23 are positioned opposite to each other across the drive head 2. The first torque-tool body 24 is terminally and concentrically connected to the first shank body 22, opposite the drive head 2. The first external thread 26 extends along the first shank body 22, in between the first torque-tool body 24 and the drive head 2; additionally, the first external thread 26 is laterally connected to the first shank body 22. This outlines a single engagement side of the present invention. Mirroring this, the second torque-tool body 25 is terminally and concentrically connected to the second shank body 23, opposite the drive head 2. The second external thread 27 extends along the second shank body 23, in between the second torque-tool body 25 and the drive head 2; additionally, the second external thread 27 is laterally connected to the second shank body 23. In this embodiment, the type of engagement cavities of the first torque-tool body 24 may vary from the type of engagement cavities of the second torque-tool body 25 to yield a two-in-one tool.

In some embodiments, the present invention may further comprise at least one cavity-transition feature 28 and a plurality of wall-transition features 29. Both the at least one cavity-transition feature 28 and the plurality of wall-transition features 29 provide a smoother shift from the at least one engagement cavity 8 and the plurality of laterally-bracing sidewalls 4 to the torque-tool body 3 and consequently to the shank body 1. As previously discussed, the at least one engagement cavity 8 is integrated into specific sidewall from the plurality of sidewalls 4. Referring to FIG. 1 through 6 and 12 through 16, the at least one cavity-transition feature 28 is terminally integrated into the engagement cavity 8, adjacent to the shank body 1. This also facilitates the insertion of the at least one torque-tool body 3 into the drive features in the fastener's head. Moreover, each of the plurality of wall-transition features 29 is terminally integrated into a corresponding laterally-bracing sidewall from the plurality of laterally-bracing sidewalls 4, adjacent to the shank body 1. In addition, each of the plurality of wall-transition features 29 may be terminally integrated into the corresponding engagement tooth 33 to increase the overall width of the engagement tooth 33. So, the number of wall-transition features 29 matches the number of laterally-bracing sidewalls 4 to form a symmetrical structure. Alternatively, the number of wall-transition features 29 may not match the number of laterally-bracing sidewalls 4 in an asymmetrical fashion.

In one embodiment, the at least one cavity-transition feature 28 comprises a first feature end 30 and a second feature end 31 corresponding to the ends of the cavity-transition feature. Referring to FIG. 1 through 6 and 12 through 16, the first feature end 30 is positioned offset from the shank body 1, while the second feature end 31 is positioned adjacent to the shank body 1. This results in the at least one cavity-transition feature 28 to extend a desired distance into the at least one shank body 1. Moreover, the at least one cavity-transition feature 28 tapers from the first feature end 30 to the second feature end 31, or from the second feature end 31 to the first feature end 30, resulting in a curved, smooth transition from the at least one engagement cavity 8 to the at least one shank body 1. In other embodiments, the at least one cavity-transition feature 28 can include other non-curved designs. Furthermore, the at least one cavity-transition feature 28 may also comprise a plurality of cavity-transition features 32, similar to how the at least one engagement cavity 8 may be a plurality of engagement cavities 19. Like the plurality of engagement cavities 19, each of the plurality of cavity-transition features 32 is terminally integrated into a corresponding engagement cavity form the plurality of engagement cavities 19, adjacent to the shank body 1.

In other embodiments, the engagement cavity 8 may be replaced with an engagement protrusion. Referring to FIG. 17 through 20, the engagement protrusion is material extruding from the torque-tool body 3 that creates an additional gripping element to the specific sidewall. Specifically, the engagement protrusion is laterally connected to the bracing surface 7 of the specific sidewall. Additionally, the engagement protrusion extends from the first base 13 to the second base 14 to ensure the additional gripping element extends along the length of the torque-tool body 3. This allows the present invention to engage the socket fastener at an increased depth, thus maximizing the torque applied to the socket fastener. Furthermore, it is preferred that the engagement protrusion is centrally positioned in between the first lateral edge 5 of the specific sidewall and the second lateral edge 6 of the specific sidewall to allow for this embodiment to be used as a clockwise and counterclockwise tool. To ensure consistent grip along the torque-tool body 3, an entire cross-section 19 of the engagement protrusion is parallel to the first base 13 and the second base 14. It is understood that all the embodiments described within the application of the present invention for use in a socket fastener, wherein the removed subject is not limited to a socket fastener. It is further understood that a socket fastener is merely used as an example and that the afore described torque tool body 3 embodiments are designed for use in any rotationally removable object. It is further understood that the afore described embodiments are designed to engage within the aperture of any rotationally removable objects wherein the torque tool body 3 may be forcibly driven into the aperture of the rotationally removable object by percussion blows to the drive head 2 and rotationally removed by applying rotational torque to the drive head 2 by an external torque tool.

Although the invention has been explained in relation to its preferred embodiment, it is to be understood that many other possible modifications and variations can be made without departing from the spirit and scope of the invention as hereinafter claimed.

What is claimed is:

1. A fastener extractor device comprising:
at least one shank body;
at least one torque-tool body;
a drive head;
a first base;
a second base;
an external thread;
a tubular sleeve;
an internal thread;
the drive head being terminally and concentrically connected to the shank body;
the torque-tool body being terminally and concentrically connected to the shank body;
the external thread extending along the shank body, in between the torque-tool body and the drive head;
the shank body being adjacently connected to the second base, opposite to the first base;
the torque-tool body comprising a plurality of laterally-bracing sidewalls and at least one engagement feature;
the plurality of laterally-bracing sidewalls being radially positioned about a rotation axis of the torque-tool body;
each of the plurality of laterally-bracing sidewalls comprising a first lateral edge, a second lateral edge, and a bracing surface;
the first lateral edge and the second lateral edge being positioned opposite to each other across the bracing surface;
the first lateral edge and the second lateral edge each being oriented parallel with the rotation axis from the first base towards the second base;
at least part of a cross-section of the torque-tool body being uniform and non-tapering from the first base towards the second base;
the at least one engagement feature being integrated into a specific sidewall among the plurality of laterally-bracing sidewalls;
the at least one engagement feature forming an engagement tooth;
the engagement tooth being parallel with the rotation axis; and
the drive head being configured to receive percussion blows, wherein the engagement tooth is configured to cut into an internal sidewall of a fastener.

2. The fastener extractor device as claimed in claim 1 comprising:
an entire cross-section of the at least one engagement cavity comprising a curved portion and a straight portion;
the curved portion being positioned adjacent to the first lateral edge of the specific sidewall;
the straight portion being positioned adjacent to the curved portion, opposite the first lateral edge of the specific sidewall; and,
the straight portion extending from the curved portion to the second lateral edge of an adjacent sidewall.

3. The fastener extractor device as claimed in claim 2 comprising:
the engagement cavity traversing normal and into a portion of the bracing surface of the specific sidewall without traversing into a remaining portion of the bracing surface of the specific sidewall;
the remaining portion of the bracing surface of the specific sidewall being flat; and,
an arc length of the curved portion being larger than a length of the remaining portion of the bracing surface of the specific sidewall and less than a length of the straight portion.

4. The fastener extractor device as claimed in claim 1, wherein the bracing surface is a flat surface.

5. The fastener extractor device as claimed in claim 1, wherein the bracing surface is a concave surface.

6. The fastener extractor device as claimed in claim 1, wherein the bracing surface is a convex surface.

7. The fastener extractor device as claimed in claim 1 comprising:
the external thread being laterally connected to the shank body.

8. The fastener extractor device as claimed in claim 7 comprising:
the internal thread being positioned within the tubular sleeve;
the internal thread extending along the tubular sleeve;
the internal thread traversing into the tubular sleeve;
the shank body being concentrically positioned within the tubular sleeve; and,
the internal thread being mechanically engaged to the external thread.

9. The fastener extractor device as claimed in claim 8 comprising:
a nut;
the nut being terminally and concentrically connected to the tubular sleeve; and,
the shank body being positioned within the nut.

10. The fastener extractor device as claimed in claim 1 comprising:

the at least one engagement feature comprises a plurality of engagement features;

the plurality of engagement features being radially positioned about the rotation axis of the torque-tool body; and, each of the plurality of engagement features being integrated into a corresponding sidewall from the plurality of laterally-bracing sidewalls.

11. The fastener extractor device as claimed in claim 1 comprising:

the at least one shank body comprising a first shank body and a second shank body;

the at least one torque-tool body comprises a first torque-tool body and a second torque-tool body;

the drive head being terminally and concentrically connected to the at least one shank body;

the first shank body and the second shank body being positioned opposite to each other across the drive head;

the first torque-tool body being terminally and concentrically connected to the first shank body, opposite the drive head; and, the second torque-tool body being terminally and concentrically connected to the second shank body, opposite the drive head.

12. The fastener extractor device as claimed in claim 11 comprising:

the at least one external thread comprises a first external thread and a second external thread;

the first external thread extending along the first shank body, in between the first torque-tool body and the drive head;

the first external thread being laterally connected to the first shank body;

the second torque-tool body being terminally and concentrically connected to the second shank body, opposite the drive head;

the second external thread extending along the second shank body, in between the second torque-tool body and the drive head; and, the second external thread being laterally connected to the second shank body.

13. The fastener extractor device as claimed in claim 1 comprising:

at least one cavity-transition feature;

a plurality of wall-transition features;

the cavity-transition feature being terminally integrated into the engagement cavity, adjacent to the shank body; and, each of the plurality of wall-transition features being terminally integrated into a corresponding laterally-bracing sidewall from the plurality of laterally-bracing sidewall, adjacent to the shank body.

14. The fastener extractor device as claimed in claim 13 comprising:

the cavity-transition feature comprising a first feature end and a second feature end;

the first feature end being positioned offset from the shank body;

the second feature end being positioned adjacent to the shank body; and, the cavity-transition feature tapering from the first feature end to the second feature end.

15. The fastener extractor device as claimed in claim 13 comprising:

the at least one engagement cavity comprising a plurality of engagement cavities;

the at least one cavity-transition feature comprising a plurality of cavity-transition features; and, each of the plurality of cavity-transition features being terminally integrated into a corresponding engagement cavity from the plurality of engagement cavities, adjacent to the shank body.

* * * * *